Sept. 13, 1949. G. LANGLEY 2,481,847
GRADE INDICATOR
Filed Feb. 21, 1947
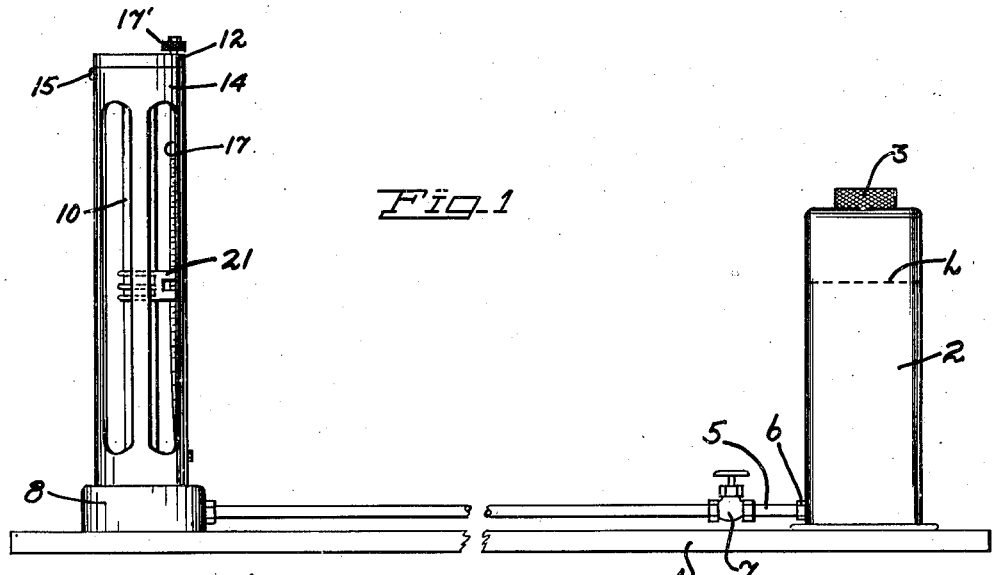
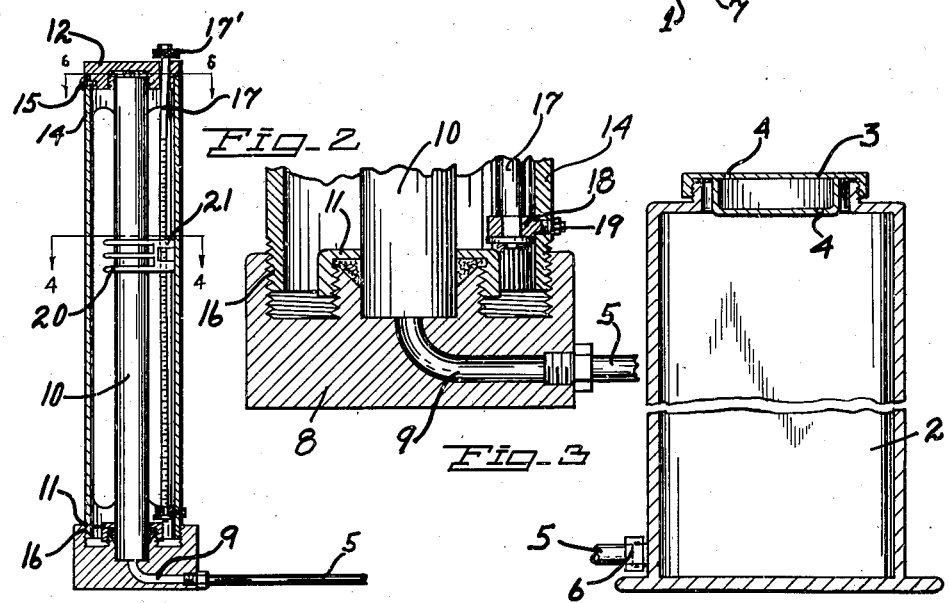
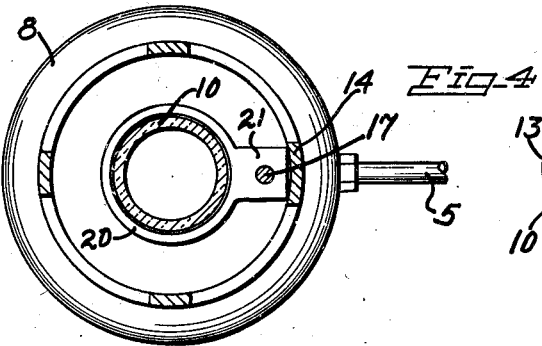
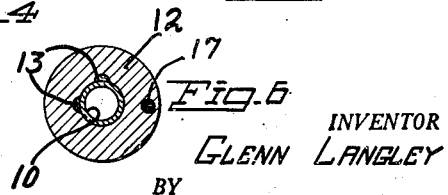
INVENTOR
GLENN LANGLEY
BY
Glenn L. Fish
ATTORNEY Patented Sept. 13, 1949

2,481,847

UNITED STATES PATENT OFFICE 2,481,847

GRADE INDICATOR

Glenn Langley, Davenport, Wash.

Application February 21, 1947, Serial No. 730,089

1 Claim. (Cl. 33—209)

The present invention relates to the general class of measuring and testing appliances of the liquid level or depth gage type employing liquid displacement or replenishment in combination with a transparent sight tube, and more specifically to an improved grade indicator or liquid level instrument, which while adapted for various purposes, is especially adapted for use on vehicles.

As an example of the utility of the instrument of my invention the grade indicator is mounted upon a tractor or road-grading implement of the wheel type or of the endless track type employed in grading roads or highways at a predetermined gradient. By observing the position of the indicator the driver of the road grading machine is enabled to maintain the predetermined declines, or inclines, and slopes of the road surface as the road or highway is being built.

The instrument of my invention is also adapted for use on threshnig machines and other agricultural implements where it is necessary to maintain a predetermined level or grade of the machine or implement to prevent undue tipping or tilting.

The primary object of the invention is the provision of an instrument comprising a minimum number of component parts that may with facility be manufactured at low cost of production, and assembled wtih convenience to provide a grade indicator that may readily be installed upon the vehicle and accurately adjusted to initial position by means of a level of the carpenter's type, as part of the equipment of the vehicle.

The invention consists in certain novel features of construction and combinations and arrangements of parts as will hereinafter be described and more specifically set forth in the appended claim.

In the accompanying drawings I have illustrated one complete example of a physical embodiment of my invention adapted for use on a road-grading tractor in which the parts are combined and arranged in accord with one mode I have devised for the practical application of the principles of my invention. It will however, be understood that various changes and alterations are contemplated and may be made in these exemplifying drawings and mechanical structures, within the scope of my claim, without departing from the principles of my invention.

Figure 1 is a view in side elevation, partly broken away for convenience of illustration, of a grade indicator in which my invention is embodied, and adapted for installation on a vehicle.

Figure 2 is a vertical sectional view of the indicating instrument.

Figure 3 is an enlarged detail vertical sectional view showing the lower end of the sight glass tube, the housing and the gage rod mounted in the base of the indicator.

Figure 4 is an enlarged transverse sectional view at line 4—4 of Fig. 2.

Figure 5 is an enlarged detail vertical sectional view of the liquid reservoir.

Figure 6 is a transverse detail sectional view at line 6—6 of Fig. 2 through the top cap and the glass tube.

As indicated in the assembly view Fig. 1 the parts of the instrument are mounted upon a baseboard 1 that is installed in precisely adjusted position and leveled on a supporting part or frame of the vehicle, and a preferably cylindrical liquid reservoir 2, containing a suitable colored liquid is partly filled approximately to the liquid level L in Fig. 1. The fixed reservoir is provided with a double wall ventilating closure or cap 3 that is equipped with breather ports or ventilating ports 4, and constructed to prevent leaks of the liquid that might otherwise be caused by splashing due to irregular movements of the vehicle.

At the base of the reservoir a feed pipe or supply pipe 5 is connected as at 6, and provided with a regulating valve 7 to adjust the flow of the colored liquid from and to the reservoir, and to and from the upright indicator or instrument that is spaced from the reservoir and mounted on the base board in position where it may readily be observed by the driver, or other attendant, of the vehicle with which the instrument is employed.

The measuring gage or indicator is mounted upon a substantial base or block 8 that is rigidly fastened to the base board, and it is provided with a laterally extending, curved duct 9 opening at the exterior of the base and to which the feed pipe 5 is connected. At the center of the base the duct 9 opens into the bottom of a transparent sight tube 10, of glass or other suitable material, and the open bottom of the tube is packed and sealed in the base by use of a flanged screw ring 11, so that a column of the colored liquid will seek its level in the indicator tube.

At its upper end the sight tube is closed by means of packed cap 12, and vent ports 13 are provided to compensate for the desired smooth and regular flow of the liquid between the vented reservoir and the vented sight tube.

The sight tube is enclosed and protected by means of a generally cylindrical, slotted housing or guard 14 to which the top cap is secured by screws 15, and the lower internally threaded end of the guard is threaded or screwed in an annular recess of the base, at 16.

Within the housing and exterior of the sight tube is mounted an upright gage rod 17 in the nature of a threaded screw bar of resilient material, with its lower end journaled to turn in a bottom bearing ring 18 having a stud bolt 19 supported in the adjacent wall of the housing or guard, and the upper end of the gage rod is journaled in a bore of the cap 12 and provided with a hand knob or head 17' exterior of the cap.

An adjustable gage or indicator is mounted on the upright tube and gage bar, and as indicated the gage includes a number of vertically spaced slide rings 20 that encircle the sight tube and are slidable thereon, and a radially or laterally projecting lug 21 that is slotted to provide two friction faces in sliding contact with the housing 14.

As indicated in Fig. 2, the threaded gage rod of resilient material is laterally flexed to offset position of the threaded lug 21 through which the rod passes, with relation to the upper and lower end bearings for the rod. Due to this frictional engagement of the gage with the housing or guard, by turning the head 17' of the threaded gage bar, the indicator or gage may be raised or lowered in sliding engagement with the guard and the tube.

The central one of the three rings 20 of the gage is used as an indicator in connection with the level of the column of colored liquid in the sight tube, and in relation to a predetermined level mark on the rotary gage rod.

In a road building operation and grading its surface the predetermined gradient is first secured by turning the head 17' to raise or lower the gage and adjust the central ring 20 with relation to the central level mark on the gage rod, and this position of the gage is thereafter maintained by frictional contact between the gage and the adjoining face of the guard or housing. The road surface is then graded with an incline, or with a decline until the level of the colored liquid in the sight tube registers with or corresponds to the central gage ring on the gage. The gage and the sight tube are in position for convenient observation by the driver of the grading implement, and he operates the implement as indicated by the gage and liquid level.

Having thus fully described my invention, what I claim as new and desire to secure by Letters Patent is:

In a grade indicator of the type described, the combination with a housing having a base and top cap, a centrally arranged sight tube mounted in the base and cap and means for supplying a column of liquid for the tube, of a resilient screw bar having end journals and forming a rotatable gage rod located between the housing and the tube, a gage having a gage-ring slidably adjustable on the tube, and said gage having an offset lug provided with a threaded bore parallel with the tube for the gage rod, whereby the rod is laterally flexed and the gage is retained in frictional contact with the housing.

GLENN LANGLEY.

REFERENCES CITED

The following references are of record in the file of this patent:

UNITED STATES PATENTS

| Number | Name | Date |
|---|---|---|
| 327,564 | MacDonald | Oct. 6, 1885 |
| 532,949 | Darragh | Jan. 22, 1895 |
| 1,045,385 | Farnham | Nov. 26, 1912 |
| 1,231,162 | Husby | June 26, 1917 |
| 1,452,126 | Ready | Apr. 17, 1923 |
| 2,405,634 | Batterman | Aug. 13, 1946 |

FOREIGN PATENTS

| Number | Country | Date |
|---|---|---|
| 6,280 | Great Britain | 1887 |